United States Patent Office 3,395,194
Patented July 30, 1968

3,395,194
PROCESS FOR PREPARING ACETYLENE IN
AN ELECTRIC ARC REACTOR
David P. Keckler, Lakewood, and John Edward Loeffler,
Jr., Lyndhurst, Ohio, assignors to Diamond Shamrock
Corporation, a corporation of Delaware
No Drawing. Continuation-in-part of application Ser. No.
487,594, Sept. 15, 1965. This application June 6, 1966,
Ser. No. 555,214
12 Claims. (Cl. 260—679)

ABSTRACT OF THE DISCLOSURE

In the preparation of acetylene in an electric arc reactor from a hydrocarbon feed, the conversion to acetylene in the reaction zone is accomplished by maintaining the temperature in the reaction zone within the range from about 1100° to 4200° C. and by maintaining the pressure therein at a superatmospheric pressure up to about 20 atmospheres. By such operation acetylene yields are substantially equivalent to atmospheric pressure operation, or can be enhanced, and other advantages include increased heat recovery after downstream quenching. Also, when acetylene recovery involves compression operation, relatively pure reactor inlet gases can be subjected to compression rather than compressing contaminated, e.g., soot and tar-containing, reaction gases.

---

This is a continuation-in-part of our co-pending application Ser. No. 487,594, filed Sept. 15, 1965.

The present invention relates to a process for the preparation of acetylene from a hydrocarbon material. More particularly, the present invention relates to a process for the preparation of acetylene from a hydrocarbon by means of electrical energy. Specifically, the present invention relates to a process for the preparation of acetylene from a hydrocarbon by means of an electric arc reactor.

At the present time the production of acetylene by pyrolysis-type reactions is generally carried out either by the so-called "partial oxidation process" or the "electric arc process." The partial oxidation process comprises the combustion of hydrocarbons, particularly the paraffinic hydrocarbon. methane, in the presence of oxygen. Basically, the process comprises preheating the hydrocarbon and oxygen separately, mixing the heated gases in a mixing chamber, and discharging the mixed gases into a reactor where a flame is maintained and the reaction is effected at temperatures approximatiing 1500° to 2500° C. While the reaction appears simple, the operation of the process under conditions which will give good yields of acetylene is difficult.

In the partial oxidation process, the atomic constituents of hydrogen, carbon and oxygen are involved. At the reaction temperatures used in this process, chemical equilibrium would dictate that the gaseous products consist almost totally of $H_2$, $H_2O$, $CO$ and $CO_2$. Acetylene appears almost entirely as an intermediate component and, accordingly, it is necessary to stop the reaction before completion of the chemical equilibrium by quenching while acetylene is at a peak level. By quenching the reaction products when the acetylene is at the peak level, acetylene decomposition is held to a minimum. However, despite such quenching the outlet gases from commercial reactors contain substantially less than 10% by volume acetylene, the remainder being predominantly hydrogen, carbon monoxide, water vapor and undesired carbonaceous products. The economics involved in such a process are adversely influenced by low concentrations of acetylene and the presence of undesired carbonaceous material which makes acetylene recovery and purification more difficult.

In the partial oxidation process, heat is quickly added to the hydrocarbon feed that is not consumed by the oxidation reactions and the pyrolysis reactions commence at a high rate to form acetylene as an intermediate product. However, acetylene decomposition reactions commence as soon as acetylene is formed. The endothermic nature of these oxidation and pyrolysis reactions quickly lowers the reaction temperature and as the temperature drops, the relative rate of the acetylene decomposition reaction increases with respect to the reactions creating acetylene. This effect, in addition to a variable combustion pattern of the flame reaction, a variable flow pattern within the reactor and the difficulty of quenching the reaction products at an optimum time because of the flame and flow patterns, limits the conversion to acetylene that can be attained. Also, the acetylene yield is dependent upon the amount of preheating, the oxygen to hydrocarbon ratio, the reaction time and the pressure at which the reaction is operated. At elevated pressures, i.e., in excess of atmospheric pressure, the rate of acetylene decomposition is greatly increased.

Basically, the electric arc process disclosed in the prior art comprises passing gas which usually contains a hydrocarbon feed generally in the presence of a diluent gas such as hydrogen, argon, etc., hereinafter called an "arc gas," through an electric arc zone which is formed between a pair of electrodes, i.e., cathode and anode, decomposing the hydrocarbon feed to form acetylene, hydrogen and carbon in a very short period of time, generally in the order of a fraction of a millisecond. For the above atmospheric pressure conditions described more fully hereinbelow, such time period is generally on the order of a fraction of a millisecond or less, e.g., 0.01–0.5 millisecond, to suppress acetylene decomposition, although longer time periods can be employed, especially where concomitant carbon production is desired. The electric arc zone is the defined area between the cathode and anode within which the electrical energy of the electric arc is concerned terminating or impinging at one or more arc strike points or terminus points. The arc strike point may vary depending upon a number of factors which include the reactor configuration or design (including external magnetic fields), the energy input, the arc gas velocity, etc. This point, however, can be readily determined by those skilled in the art with any given reactor design, energy input, arc gas velocity, etc. The nature of the electric arc is such that the arc gas is ionized in the electric arc zone creating a high temperature gaseous discharge stream of the arc gas, hereinafter usually called an "ionized gas stream" or "plasma stream." In similar manner, arc reactors producing a high ion-content "plasma stream" are often referred to in the art as "plasma reactors."

The electric arc produces temperatures within the range from about 800° C. near the surface of the electrodes to more than 5000° C. within the electric arc zone thereby creating varying energy levels within the arc zone resulting in a discontinuity which abruptly changes the energy of the gaseous elements within the arc zone resulting in varying degrees of chemical conversion of the hydrocarbon feed. The gases at the lower temperatures are only slightly ionized, whereas the gases at the high temperatures are highly dissociated and ionized, which can result in minimal production of acetylene and the formation of relatively large quantities of carbon.

In the electric arc process only the atomic constituents, carbon and hydrogen, need be involved and the unfavorable equilibrium discussed hereinabove with a carbon-hydrogen-oxygen system is eliminated. However, with the exception of the variable flame pattern problem involved in the partial oxidation process, the same factors are encountered in existing electric arc processes; particularly the competing reactions of the decomposition of the hydrocarbon molecules to acetylene, hydrogen and carbon and the reverse action of the recombination of the decomposition products to form a hydrocarbon and carbon. As with the partial oxidation process the net yield of acetylene from any arc process is critically dependent upon the effectiveness and speed of cooling the product gas stream to temperatures well below the range of rapid decomposition. As a consequence thereof, a major proportion of the work to date has involved extensive investigation of various types of quenching methods to bring the temperature of the product gases below the decomposition temperatures of acetylene to "freeze" the decomposition reaction at that point when the maximum amount of acetylene is present in the product gases.

It has now been found that a process for achieving maximum production of acetylene from hydrocarbons in an electric arc reactor may be achieved by converting the hydrocarbon to acetylene with electrical energy in a reaction zone by subjecting the hydrocarbon feed in the reaction zone to a temperature maintained within the range from about 1100° C. to 4200° C., and superatmospheric pressures up to about 20 atmospheres, preferably about 2.5 to 10 atmospheres, for a sufficient period of time to effect conversion of the hydrocarbon feed to acetylene. It has been found that the conversion of a hydrocarbon to acetylene in an electric arc reactor approaches a product composition dependent upon the temperature and pressure employed if the hydrocarbon is brought to and maintained in the reaction zone of the electric arc reactor within the above range of temperature and pressure. Specifically, it has been found that when a hydrocarbon feed is subjected to a plasma stream within a post arc zone of the electric arc reactor, or when a hydrocarbon plasma stream is reacted in the electric arc zone of a reactor, conversions of 80% or more of the hydrocarbon feed to acetylene, equivalent to prior art electric arc methods employing atmospheric and sub-atmospheric pressures, are obtained by subjecting the hydrocarbon feed in the reaction zone to a temperature within the range of about 1100° to 4200° C., and preferably 1100° to 2500° C. when a hydrocarbon feed is subjected to a plasma stream within a post arc zone of a reactor, with operating pressures maintained as high as 20 atmospheres, preferably from 2.5 to 10 atmospheres. The post arc zone is the defined area immediately following the arc strike point or terminus point of the arc zone, wherein the major proportion of the arc gas is substantially entirely in an ionized state, taking into account normal strike point fluctuations arising from gas turbulence. The reaction zone for subjecting a hydrocarbon feed to a plasma stream within a post arc zone, begins at the arc strike point and terminates at the point where the product gases are quenched; the reaction zone for a hydrocarbon plasma stream reacted in the electric arc zone, begins at the contact point of feed hydrocarbon with the electric arc and terminates at the point where the product gases are quenched.

By adjusting the energy input of the electric arc apparatus to provide an average reaction temperature within the reaction zone to within the above range, i.e., 1100° to 4200° C., and preferably 1100° to 2500° C. for subjecting a hydrocarbon feed in a post arc zone to a plasma stream, acetylene yields from the hydrocarbon feed obtained at pressures as high as 20 atmospheres are substantially equivalent or higher than acetylene yields of prior art electric arc operations operated at atmospheric pressure or less. By being able to operate at these higher pressures certain advantages result, for instance, smaller equipment and piping sizes can be employed more conveniently than normally required in electric arc operations conducted at atmospheric or subatmospheric pressures; reduction in compression requirements of the extensive compression operation prior to acetylene recovery and purification; and permitting increased heat recovery at the higher pressure. As the gases produced subsequently have to be compressed in order to separate the acetylene from the other products, operating at superatmospheric pressure also allows a savings in plant costs and power consumption as compared to operations conducted at pressures of atmospheric or less. Also, since the product gases leaving the post-arc zone have to be rapidly cooled to a temperature below about 1000° C., preferably below about 600° C. with a quenching medium such as water in order to avoid decomposition of the acetylene, heat can be recovered from the quenching medium to supply the heat requirements of the operation thereby achieving a saving of steam. Further, by operating at superatmospheric pressures up to about 20 atmospheres, with pressure of 2.5 to 10 atmospheres being especially preferred, the removal of residual soot and scrubbing of undesirable organics, e.g., naphthalene and heavy acetylenes, in the product gas stream prior to compression is aided. In other words, operating at superatmospheric pressure simplifies the acetylene recovering and purification portion of the plant and heat recovery.

As mentioned previously, in an electric arc the arc gas generally is subject to a wide variance in temperature levels therein and cannot be easily regulated. However, the power input of the electric arc can be adjusted or manipulated so that, for a hydrocarbon plasma stream reacted in an electric arc zone, or for a hydrocarbon feed subjected to a plasma stream within a post arc zone, the average temperature in the reaction zone can be maintained within the desired temperature range.

In the practice of the present invention the arc gas may be composed of either a diluent gas, i.e., hydrogen, argon, etc., as the sole constituent, or of the hydrocarbon feed which is to be converted to acetylene. If the arc gas comprises the diluent gas as the sole constituent, the hydrocarbon feed is introduced into the electric arc apparatus at approximately the arc strike point of the arc gas in the arc zone, and preferably just downstream from the arc strike point. Turbulence of the hydrocarbon feed, which can be assisted by fluctuation in the arc strike point, as well as normal turbulence of the arc gas, achieves a uniform mixture of the plasma stream and hydrocarbon feed material forming a reaction gas in the post arc zone where a temperature, preferably within the range from about 1100° to 2500° C. is maintained at superatmospheric pressure. In the event the arc gas comprises a hydrocarbon feed as its sole constituent, the major portion of the hydrocarbon which is converted to acetylene is preferably the arc gas converted in the reaction zone where a temperature within the range from about 1100° to 4200° C. is maintained at superatmospheric pressure, but a minor portion of the hydrocarbon for conversion to acetylene can be introduced into the electric arc reactor at approximately the arc strike point, and preferably just downstream from the arc strike point, for conversion in the post-arc zone. Usually, where no minor portion of hydrocarbon is introduced at approximately the arc strike point, gas is maintained within the reaction zone for less than about 0.5 millisecond, and preferably for about 0.2 millisecond or less to suppress carbon formation.

When virtually all of the hydrocarbon feed to be converted to acetylene is introduced into the electric arc apparatus at approximately the arc strike point, the arc gas preferably comprises a mixture of diluent gas and hydrocarbon feed with an especially preferred arc gas composition comprising mixture of hydrogen and hydrocarbon wherein the hydrocarbon content of the arc gas comprises about 1% to 95%, preferably 3% to 15% by volume, of the total volume of the hydrocarbon feed material which is to be converted to acetylene. The remaining hydrocarbon is introduced into the electric arc reactor at approximately the arc strike point. By achieving a uniform mixing of the plasma stream and hydrocarbon feed in the reaction zone a high conversion to acetylene is advantageously attained in less than 0.5 millisecond, preferably between about 0.1 to 0.25 millisecond.

High conversions of the feed hydrocarbon to acetylene are achieved (at superatmospheric pressures within the above temperature range and reaction times) without the formation of free carbon exerting any appreciable affect on the reaction composition. The equilibrium state of the particular hydrocarbon feed employed may be readily calculated using well recognized procedures of relating the heat energy input, to the amount and composition of the hydrocarbon stream. One such procedure which may be employed is referred to as the "Free Energy Minimization Method," Journal of Chemical Physics, vol. 28, No. 5, 751–755; Chemical Engineering, Feb. 19, 1962, 121–128. By employing this method, the energy input, gas feed flows and compositions may be adjusted to provide the desired final gas composition.

Any electric arc reactor, including those of the so-called "plasma jet" design, i.e., a reactor producing a high ion-content "plasma" stream, wherein the electric arc strike point can be determined or known and one capable of withstanding the high pressures used may be employed. Since the temperatures in the reaction zone should be maintained within the above indicated ranges at superatmospheric pressures to achieve maximum conversion of the hydrocarbon feed to acetylene with minimum conversion to carbon, it is desirable to reduce the heat losses in the reaction zone by employing low heat conducting materials, for example, tungsten, carbon, etc. as construction material in this section of the electric arc apparatus.

Once equilibrium is achieved for conversion in a post arc reaction zone, or for direct conversion in an electric arc zone, the product gas should be rapidly quenched to avoid decomposition of the acetylene to carbon and/or polymerization of the acetylene containing product, if the temperature of the product gas is allowed to be slowly lowered. Such quenching or cooling of the product gas should be effected in a matter of microseconds to a temperature below about 1000° C., preferably below about 600° C. Cooling to ambient temperatures may then proceed at a somewhat slower and more conventional rate. To achieve the high rate of initial cooling, injection of cold gas or liquid, i.e., hydrocarbon, water, etc., into the product gas is normally employed. It is, of course, preferred that the gas or liquid entrained or admixed with the hot product gases, be of such a nature, that it does not contaminate the product stream with gases difficult to remove. Water has been found to be an especially suitable quenching medium for use with the present invention.

Suitable hydrocarbon feed materials which may be employed can be saturated or unsaturated hydrocarbons and aromatics containing up to 8 or more carbon atoms. Exemplary of saturated hydrocarbons include methane, ethane, propane, isopropane, butane, isobutane, pentane, etc.; exemplary of suitable unsaturated hydrocarbons include ethylene, the propylenes; the butylenes; etc.; exemplary of suitable aromatics include benzene, toluene and the xylenes. The preferred hydrocarbon feed materials are the saturated aliphatic hydrocarbons containing 1 to 4 carbon atoms with methane being the especially preferred feed material. The hydrocarbon feed, e.g., methane employed does not need to be pure; for instance, commercial sources of methane, e.g., from natural gas and off-gases, containing small amounts of other hydrocarbons may be employed. The concentration of acetylene based on conversion of the feed will vary with the amount of diluent gas, preferably, hydrogen, employed. The atomic ratio of hydrogen to carbon should be maintained approximately within the range from about 4 to 10:1 to achieve maximum acetylene yields and prevent excess dilution that makes the recovery of acetylene difficult.

In order that those skilled in the art may better understand the present invention and the preferred method by which it may be practiced, the following specific examples are offered.

Example I

Into an electric arc reactor of the plasma-jet design, operated under a pressure of 4 atmospheres, is introduced 33 m.$^3$ per hour (measured at 1 atmosphere and 25° C.) of hydrogen and 16.5 m.$^3$ per hour (measured at 1 atmosphere and 25° C.) of natural gas. The hydrogen stream and natural gas stream are separately preheated to 600–650° C. and combined and introduced into the reactor as the arc gas which serves to carry the electric arc between the cathode and anode of the reactor. At approximately the arc strike point an additional 16.5 m.$^3$ per hour (measured at 1 atmosphere and 25° C.) of natural gas, preheated to 600° C., is introduced into the reactor. A uniform mixture between the natural gas stream and plasma stream is attained. The atomic ratio of hydrogen to carbon is about 5.7 to 1. This mixture of reaction gas is maintained in the reaction zone for approximately 0.25 millisecond and passes through a temperature range from about 2600° C. to about 1100° C. as the gases progress to the quench point, whereby the product gas stream is rapidly quenched with water to a temperature of about 150° C. In addition to the heat added to preheat the gas stream about 117 kw. per hour of electrical energy is added to the reactor. Heat loss to the reactor cooling water is equivalent to about 18 kw. per hour.

The resulting product stream is found to contain about 31.6 pounds of acetylene (on an hourly production level), which is equivalent to an acetylene concentration in the product gas stream (dry basis) of 14.6%, by volume.

Example II

Into an electric arc reactor of the plasma jet design, operated under a pressure of about 5 atmospheres, is introduced 39.5 m.$^3$ per hour (measured at 1 atmosphere and 25° C.) of hydrogen and 2 m.$^3$ per hour (measured at 1 atmosphere and 25° C.) of natural gas. The hydrogen stream and natural gas stream are separately preheated to about 600° C. and combined and introduced into the reactor as the arc gas which serves to carry the electric arc between the cathode and anode of the reactor. At approximately the arc strike point an additional 37.5 m.$^3$ per hour of natural gas (measured at 1 atmosphere and 25° C.), preheated to 500° C., is introduced into the reactor. A uniform mixture between the natural gas stream and plasma stream is attained. The atomic ratio of hydrogen to carbon is about 5.7 to 1. This mixture of reaction gas is maintained in the post-arc zone of the reactor at a temperature level within the range of about 2600° to 1100° C. for approximately 0.25 millisecond after which the product gas stream is rapidly quenched with water to a temperature of about 150° C. In addition to the heat added with the preheated gas streams about 141 kw. per hour of electrical energy is added to the reactor. Heat loss to the reactor cooling water is equivalent to about 21 kw. per hour.

The resulting product stream is found to contain about 36 pounds of acetylene (hourly basis), which is equivalent to an acetylene concentration (dry basis) in the product gas of 14.1%, by volume.

Example III

A series of runs are performed following the procedure employed in Examples I and II in an electric arc reactor of the plasma jet design using methane as the hydrocarbon feed without a diluent. Various reaction temperatures, regulated by adjusting the energy input, and pressures are employed in the reaction zone. The atomic ratio of hydrogen to carbon is slightly less than 4 to 1. The acetylene conversion at the various temperatures and pressures are presented in Table 1, below.

TABLE 1

| Pressure (atm.) | Percent conversion of feed to acetylene * at 1,727° C. | Percent conversion of feed to acetylene * at 2,027° C. | Percent conversion of feed to acetylene * at 2,227° C. |
|---|---|---|---|
| 1 | 89.8 | 82.6 | 73.6 |
| 5 | 83.2 | 85.8 | 81.6 |
| 10 | 76.4 | 85.0 | 83.0 |
| 15 |  | 83.6 | 83.4 |

* Based on the carbon content of the hydrocarbon in the feed gases related to the carbon content of the acetylene in the product gases.

As can be readily seen from these data that by employing an elevated reaction temperature, acetylene conversion is substantially as good or better at elevated pressures, i.e., 5, 10 and 15 atmospheres, as at atmospheric pressure.

Example IV

Another series of runs are performed following the procedure of the previous examples at various temperatures and pressure levels in the reaction zone, except that hydrogen is employed as a diluent gas and the atomic ratio of hydrogen to carbon of the reaction gas is 7 to 1. The acetylene conversion at the various temperatures and pressures are presented in Table 2, below.

TABLE 2

| Pressure (atm.) | Percent conversion of feed to acetylene * at 1,727° C. | Percent conversion of feed to acetylene * at 2,027° C. | Percent conversion of feed to acetylene * at 2,227° C. |
|---|---|---|---|
| 1 | 92.8 | 88.4 | 81.0 |
| 5 | 84.4 | 90.2 | 87.2 |
| 10 | 75.6 | 91.6 | 87.8 |
| 15 |  | 93.4 | 87.6 |

* Based on the carbon content of the hydrocarbon in the feed gases related to the carbon content of the acetylene in the product gases.

These data likewise demonstrate that high conversion of acetylene is obtained at elevated pressures in an electric arc reactor by maintaining the desired temperature range within the reaction zone.

Example V

Into an electric arc reactor operated at a pressure of 4 atmospheres, is introduced 245 m.³ per hour (measured at 1 atmosphere and 25° C.) of natural gas. No other gas is added. The natural gas is preheated at about 500° C. and is maintained within the reactor, from initial exposure to the arc, to subsequent quenching for less than 0.0001 second. From initial exposure to the arc until subsequent quenching, the gas is maintained within the temperature range from about 4000° C. to about 1100° C. (just before quenching).

In addition to the heat added to the gas stream during preheating, about 730 kw. per hour of electrical energy is added to the reactor. Heat loss to the reactor walls is equivalent to 125 kw. per hour. The resulting product stream is found to contain about 210 pounds of acetylene. On a dry basis, the product gas contained about 23% acetylene by volume.

It is to be understood that the invention is not limited by the specific examples and embodiments described hereinabove, but includes such changes and modifications as may be apparent to one skilled in the art upon reading the appended claims.

What is claimed is:

1. A method for preparing acetylene in a reaction zone of an arc reactor from a hydrocarbon feed which comprises the steps of establishing and maintaining said zone at a superatmospheric pressure maintained within the range from about 2.5 atmospheres up to about 20 atmospheres and a temperature maintained within the range from 4200° C. down to about 1100° C., and subjecting said feed within said zone to said temperature and pressure conditions for a sufficient period of time to effect conversion of said feed to acetylene.

2. The method of claim 1 wherein the hydrocarbon feed is a saturated hydrocarbon containing from about 1 to 8 carbon atoms.

3. The method of claim 1 wherein the pressure in the reaction zone is maintained within the range from 2.5 to 10 atmospheres.

4. The method of claim 1 wherein the conversion of the hydrocarbon feed to acetylene is effected in the reaction zone in less than 0.5 millisecond.

5. The method of claim 1 wherein the product is rapidly quenched as it leaves the reaction zone with a quenching medium to a temperature below about 1000° C.

6. A method for preparing acetylene in an electric arc reactor from a hydrocarbon feed containing 1 to 8 carbon atoms which comprises the steps of ionizing an arc gas in an electric arc zone to form an at least partially ionized arc gas stream, forming a reaction gas containing said hydrocarbon feed and said arc gas stream in a reaction zone of said reactor, establishing and maintaining said zone at a superatmospheric pressure maintained within the range from about 2.5 atmospheres up to about 20 atmospheres and a temperature maintained within the range from 4200° C. down to about 1100° C., subjecting said reaction gas in said reaction zone to said temperature and pressure conditions for a sufficient period of time to effect conversion of said hydrocarbon feed to an acetylene-containing product gas and recovering acetylene from said product.

7. The method of claim 6 wherein the hydrocarbon feed is a saturated hydrocarbon containing from about 1 to 8 carbon atoms and the arc gas is selected from the group consisting of hydrogen, a hydrocarbon containing 1 to 8 carbon atoms and a mixture of hydrogen and hydrocarbon containing 1 to 8 carbon atoms.

8. The method of claim 7 wherein the arc gas contains 1% to 95%, by volume, of the total volume of hydrocarbon to be converted to acetylene.

9. The method of claim 6 wherein hydrocarbon feed is introduced into the reactor at about the arc strike point.

10. The method of claim 6 wherein the pressure in the reaction zone is maintained within the range from 2.5 to 15 atmospheres, and the conversion time of the hydrocarbon feed to acetylene is less than 0.5 millisecond.

11. A method for preparing acetylene in an electric arc reactor from a hydrocarbon feed containing 1 to 8 carbon atoms which comprises the steps of introducing said hydrocarbon feed into an electric arc zone, establishing and maintaining a reaction zone, which zone includes said electric arc zone, at a superatmospheric pressure maintained within the range from about 2.5 atmospheres up to about 20 atmospheres and a temperature maintained within the range from 4200° C. down to about 1100° C., subjecting gas within said reaction zone to said temperature and pressure conditions for a period of time sufficient to affect conversion of hydrocarbon feed to an acetylene-containing product gas, and quenching said product gas downstream from the electric arc zone, wherein said reaction zone begins with the introduction of the hydrocarbon feed into the electric arc zone and terminates with the quenching of product gas.

12. The method of claim 11 wherein the pressure in the reaction zone is maintained within the range from 2.5 to 15 atmospheres, and the conversion time of the hydrocarbon feed to acetylene is less than about 0.5 millisecond.

References Cited

UNITED STATES PATENTS

| | | | |
|---|---|---|---|
| 2,985,698 | 5/1961 | Pechtold et al. | 260—679 |
| 3,051,639 | 8/1962 | Anderson | 260—679 |
| 3,248,446 | 4/1966 | Pollock et al. | 260—679 |

FOREIGN PATENTS 29,612  4/1933  Netherlands.

DELBERT E. GANTZ, *Primary Examiner.*

J. D. MYERS, *Assistant Examiner.*